United States Patent
Chang et al.

(10) Patent No.: US 12,455,694 B2
(45) Date of Patent: Oct. 28, 2025

(54) INPUT-OUTPUT MEMORY MANAGEMENT UNIT WITH MEMORY PROTECTION

(71) Applicant: MEDIATEK INC., Hsin-Chu (TW)

(72) Inventors: Yu-Tien Chang, Hsinchu (TW); Lin-Ming Hsu, Hsinchu (TW); Chun-Ming Chou, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 27 days.

(21) Appl. No.: 18/540,739

(22) Filed: Dec. 14, 2023

(65) Prior Publication Data

US 2024/0201874 A1 Jun. 20, 2024

Related U.S. Application Data

(60) Provisional application No. 63/387,285, filed on Dec. 14, 2022.

(51) Int. Cl.
 *G06F 3/06* (2006.01)
(52) U.S. Cl.
 CPC .......... *G06F 3/0622* (2013.01); *G06F 3/0655* (2013.01); *G06F 3/0673* (2013.01)
(58) Field of Classification Search
 CPC ..... G06F 3/0622; G06F 3/0655; G06F 3/0673
 See application file for complete search history.

(56) References Cited

U.S. PATENT DOCUMENTS

| | | | | |
|---|---|---|---|---|
| 2008/0114906 | A1* | 5/2008 | Hummel | G06F 12/0284 710/22 |
| 2016/0085688 | A1* | 3/2016 | Franko | G06F 12/0864 711/128 |
| 2018/0314645 | A1* | 11/2018 | Meredith | G06F 12/1045 |
| 2022/0405212 | A1* | 12/2022 | Kakaiya | G06F 12/1425 |

* cited by examiner

*Primary Examiner* — Zhuo H Li
(74) *Attorney, Agent, or Firm* — Winston Hsu

(57) ABSTRACT

A system on chip includes a dynamic random access memory (DRAM) controller, a secure range (SR) permission checker, a plurality of intellectual property (IP) cores. The DRAM controller includes a SR table configured to store a start address, an end address, and enabled registers of each SR and an access identification (AID) permission table configured to store access permissions of SRs of each AID. The SR permission checker is embedded in the DRAM controller or a bus and linked to the SR table and the AID permission table, and configured to check the access permissions of the SRs according to the AID permission table. The plurality of IP cores linked to the DRAM controller, and comprising a translation lookaside buffer (TLB) comprising an input-output memory management unit (IOMMU) table or an input-output memory protection unit (IOMPU) table to store SR information.

19 Claims, 4 Drawing Sheets

INPUT-OUTPUT MEMORY MANAGEMENT UNIT WITH MEMORY PROTECTION

CROSS REFERENCE TO RELATED APPLICATIONS

This application claims the benefit of U.S. Provisional Application No. 63/387,285, filed on Dec. 14, 2022. The content of the application is incorporated herein by reference.

BACKGROUND

Memory protection is a mechanism for the operating system to manage access rights to the memory on the computer or other devices. The main purpose of memory protection is to prevent a process from accessing an address space that is not allocated for the process by the operating system. This mechanism can prevent a certain process from intentionally or unintentionally affecting the execution status and data of the operation system due to certain software errors and software attacks.

Protection may include all accesses to a specific area of memory, write accesses, read accesses, or attempts to execute the contents of the area. An attempt to access unauthorized memory results in a hardware fault such as a segmentation fault, storage violation, generally causing abnormal termination of the offending process. Memory protection for computer security includes additional techniques such as address space layout randomization and executable space protection.

Memory protection further includes checking the accesses from different intellectual property (IP) cores. The accesses can be permitted if the IP is allowable for the secure range (SR) in the dynamic random access memory (DRAM) access. However, a traditional memory protection includes secure ranges composed by configured continuous address space in physical memories and managed by a traditional generic memory protection unit (MPU). The memory utilization is low by using the traditional generic memory protection unit (MPU) due to the continuous address space assigned in secure ranges, thus a memory protection method using input-output memory management unit (IOMMU) is desired.

SUMMARY

An embodiment provides a system on chip including a dynamic random access memory (DRAM) controller, a secure range permission checker and a plurality of intellectual property (IP) cores. The dynamic random access memory (DRAM) controller includes a secure range (SR) table configured to store a start address, an end address, and enabled registers of each secure range, and an access identification (AID) permission table configured to store access permissions of secure ranges of each access identification. The secure range permission checker is embedded in the dynamic random access memory (DRAM) controller or a bus, linked to the secure range (SR) table and the access identification (AID) permission table, and configured to check the access permissions of the secure ranges according to the access identification (AID) permission table. The plurality of intellectual property (IP) cores are linked to the dynamic random access memory (DRAM) controller, and includes a translation lookaside buffer (TLB) comprising an input-output memory management unit (IOMMU) table or an input-output memory protection unit (IOMPU) table to store secure range information (SR_info), and each IP core is configured to access specific data in the DRAM according to the secure range information (SR_info).

Another embodiment provides a computing device includes a plurality of intellectual property (IP) cores each being represented by an access identification (AID), a dynamic random access memory (DRAM) with a management table configured to store secure range information (SR_info) corresponding to the physical address and the virtual address, and a secure range permission checker embedded in a dynamic random access memory (DRAM) controller or a bus, configured to check access permissions of secure ranges according to the access identification (AID) and the secure range information (SR_info) obtained by the management table in accordance with a DRAM access request issued by the IP core. The virtual address or the physical address is conveyed in the access request.

Another embodiment provides a method for controlling access permissions to a memory including issuing an access request with an address information to the memory by a master represented by an access identification, checking the address information is a virtual address or a physical address in a translation lookaside buffer (TLB), fetching a physical address and a first secure range information (SR_info) from an IOMMU table when the address information is the virtual address, and fetching the first secure range information (SR_info) from a IOMPU table when the address information is the physical address.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
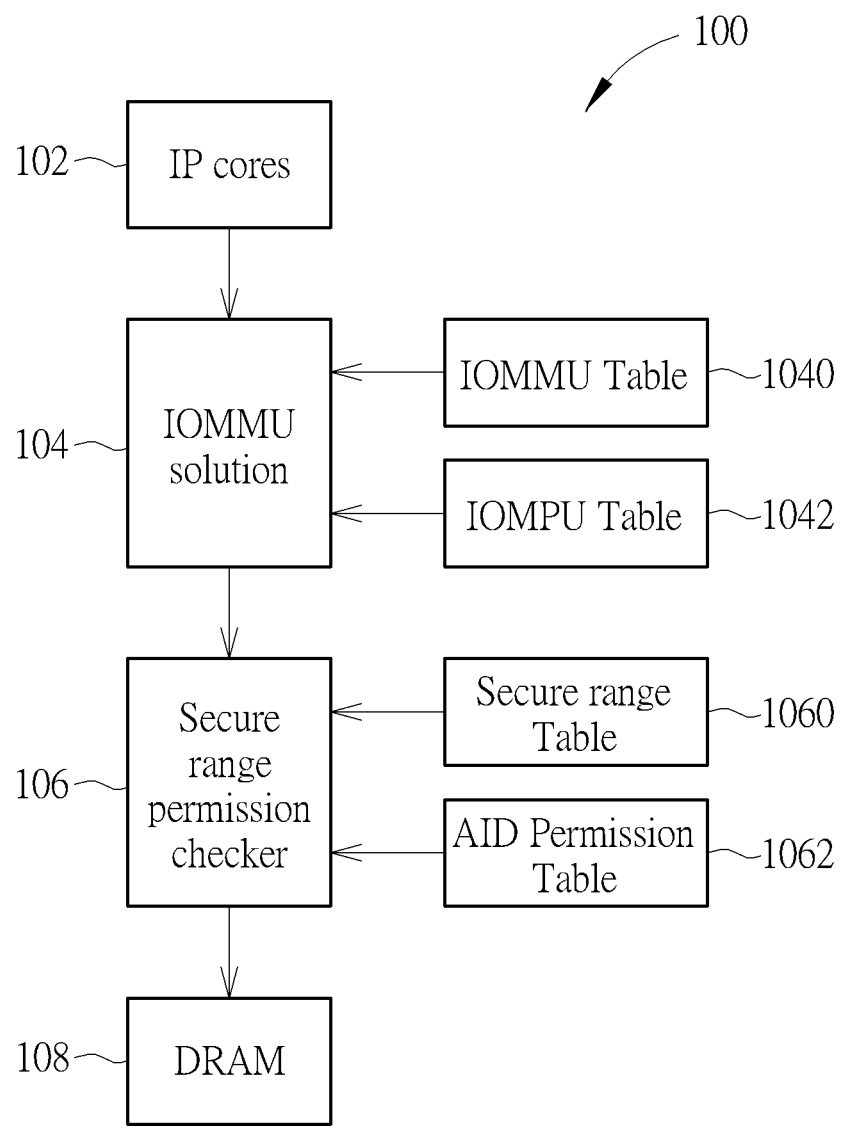
FIG. 1 is a block diagram of a system on chip according to an embodiment of the present invention.

FIG. 1 is a block diagram of a system on chip 100 according to an embodiment of the present invention. The system on chip 100 includes a plurality of intellectual property (IP) cores 102, an input-output memory management unit (IOMMU) solution 104 coupled with the IP cores 102, and a secure range permission checker 106 coupled with the IOMMU solution 104. In the present embodiment, the IOMMU solution 104 includes an input-output memory management unit table 1040 and an input-output memory protection unit (IOMPU) table 1042. The input-output memory management unit (IOMMU) table 1040 is configured to store physical addresses corresponding to virtual addresses, and page-based secure range information (page-based SR_info) corresponding to the physical addresses. The input-output memory protection unit (IOMPU) table 1042 is configured to store page-based secure information range (page-based SR_info) corresponding to the physical addresses. The secure range permission checker 106, linked to a secure range table 1060 and an access identification (AID) permission table 1062, is configured to check the access permissions of the secure ranges according to the access identification (AID) permission table. A dynamic random-access memory (DRAM) 108 is coupled to the secure range permission checker 106.

In the present embodiment, some of the plurality of IP cores 102 includes memory management unit, such as CPU and GPU, so that those IP cores may post an access request with physical address information directly to access the DRAM 108. Thus, the page-based secure range information (page-based SR_info) would be retrieved from the input-output memory protection unit (IOMPU) table 1042.

For other IP cores posting the memory access request with the virtual address only, the page-based secure range information (page-based SR_info) would be retrieved from the input-output memory management unit (IOMMU) table 1040 to access the DRAM 108. That said, when an IP core posts an access request with a virtual address (VA), it is required to look up the Input-Output Memory Management Unit (IOMMU) table 1040 to resolve the physical address and to obtain the page-based secure range information (page-based SR_info) corresponding to the virtual address and the physical address. When an IP core posts an access request with a physical address (PA), it may look up the input-output memory protection unit (IOMPU) 1042 table to retrieve the page-based secure range information (page-based SR_info) corresponding to the physical address.

However, in the other embodiment, the system may not look up the input-output memory protection unit (IOMPU) 1042 table when an IP core request an access with a physical address (PA). Instead, the page-based secure range information (page-based SR_info) is assigned to a fixed value, such as 31, by coding in the Register-Transfer Level (RTL) code or configuring with software.

To be clear, both of the IOMMU table 1040 and the IOMPU table 1042 are configured to store the page-based secure range information. A region-based secure range information is to be defined by the start address and the end address stored in the secure range table 1060. The secure range table 1060 is configured to store the start address and the end address so that at least one continuous memory space is defined as a protection range by the start address and the end address stored in the secure range table 1060. The continuous memory space defined by the start address and the end address is represented by a region-based secure range information (region-based SR_info).

When the IP core 102 posts an access request to the DRAM 108, a page-based secure range information may be obtained by looking up the IOMMU table 1040 and the IOMPU table 1042 and a region based secure range may be obtained by looking up the secure range table 1060 according to the physical address of the access request. In general scenario, the page-based secure range information and the region-based secure range information may be the same. Then the secure range e permission checker 106 would check the access identification (AID) permission table with the corresponding secure range info.

In the other scenario, the page-based secure range information and the region-based secure range information may be different. For example, the dram access physical address is 0x0000. By looking up the IOMMU table 1040 or the IOMPU table 1042, the page-based SR_info is 5. However, according to the secure range table 1060, the region-based SR_info is 3. In this scenario, the secure range permission checker 106 may identify such access is not permitted, or use the minimum value of the SR_info to check the permission in the AID permission table 1062.

In another example, the dram access physical address is 0x0000. By looking up the IOMMU table 1040 or the IOMPU table 1042, the page-based SR_info is 5. However, according to the secure range table 1060, there are no hits for the region-based SR_info. Then, the secure range permission checker 106 may use the page-based SR_info, which is 5 in this example, to check the permission in the AID permission table 1062.

Yet still in the other example, the dram access physical address is 0x0000. By looking up the IOMMU table 1040 or the IOMPU table 1042, the physical address "0X000" is indicated as non-secure region (NSR) in the IOMMU table 1040 or the IOMPU table 1042. However, according to the secure range table 1060, the region-based SR_info is 3. Then, the secure range permission checker 106 may use the region-based SR_info, which is 3 in this example, to check the permission in the AID permission table 1062.

Figure 2:
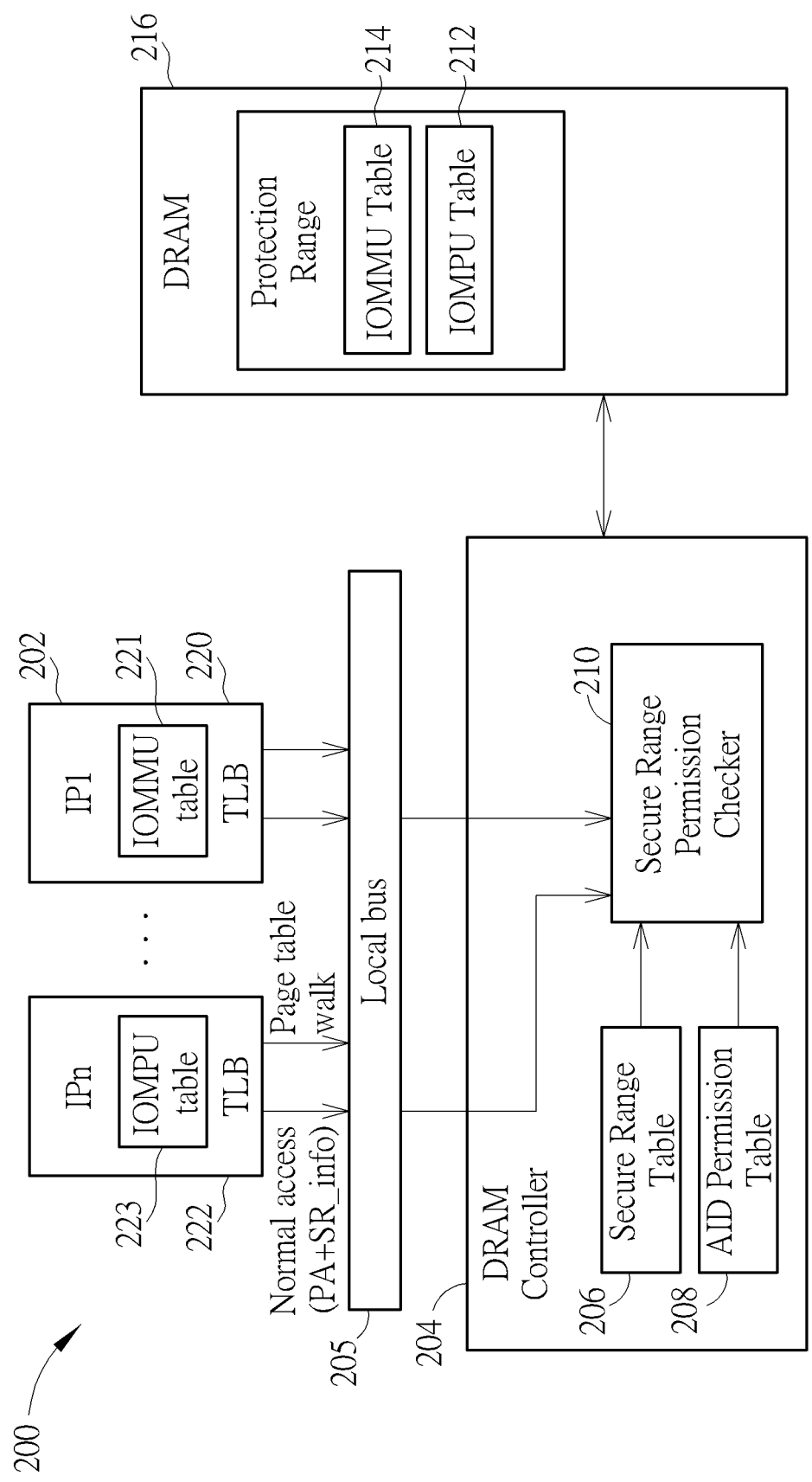
FIG. 2 is a block diagram of a system on chip according to another embodiment of the present invention.

FIG. 2 is a block diagram of a system on chip 200 according to another embodiment of the present invention. The plurality of intellectual property (IP) cores 202 are linked to the dynamic random access memory (DRAM) controller 204 with a local bus 205. The local bus 205 is further linked to a dynamic random access memory (DRAM) 216.

The dynamic random access memory (DRAM) 216 includes an input-output memory management unit (IOMMU) table 214 configured to store physical addresses corresponding to virtual addresses, and page-based secure range information (page-based SR_info) corresponding to the physical addresses, and an input-output memory protection unit (IOMPU) table 212 configured to store page-based secure range information (page-based SR_info) corresponding to the physical addresses.

Any and all requests posted for retrieving information from the IOMMU table 214 or the IOMPU table 212 in the ambit of the DRAM 216 are mediated and managed by an arbitration unit accommodated within the local bus 205, which is not depicted in the diagram for the purpose of clarity and simplicity.

The dynamic random access memory (DRAM) controller 204 includes a secure range (SR) table 206 configured to store a start address, an end address, and enabled registers of each secure range, an access identification (AID) permission table 208 configured to store access permissions of secure ranges s of each access identification, and a secure range permission checker 210 linked to the secure range (SR) table and the access identification (AID) permission table, and configured to check the access permissions of the secure ranges according to the access identification (AID) permission table.

The plurality of intellectual property (IP) cores 202 are linked to the input-output memory management unit (IOMMU) table 214, the input-output memory protection unit (IOMPU) table 212, and the dynamic random access memory (DRAM) controller 204 through the local bus 205.

In the present embodiment, both of IOMMU and IOMPU are parts of IOMMU solution. The security isolation between the IP cores 202 is supported by the IOMMU table 214 solely, the IOMPU table 212 solely or the mixed operation of the IOMMU table 214 and the IOMPU table 212.

For certain IP cores posting an access request with the physical address (PA) information of the DRAM 216 directly, the IP cores can retrieve the page-based secure range information (page-based SR_info) by looking up the IOMPU table 212. For certain IP cores posting an access request with virtual address (VA) information of the DRAM 216 only, such IP cores may retrieve the corresponding physical address and the page-based secure range information (page-based SR_info) by looking up the IOMMU table 214. In some embodiment, the system on chip 200 may contain both the IP cores possessing virtual address (VA) information only and IP cores possessing the physical address (PA) information.

When the IP core posts an access request to the DRAM, there are two steps to be implemented in the present embodiment. One is to look up the IOMMU table 214 or IOMPU table 212 in the step of page table walk. The other is to pass the physical address of the DRAM, the access identification (AID) of the IP core, the page-based SR_info retrieved from the IOMMU table or IOMPU table to the secure range permission checker 210. To be noted, the physical address (PA) can be possessed by the IP core 202 directly or translated from the IOMMU table 214 according to the virtual address (VA) during the page table walk. Then, the secure range permission checker 210 may determine the access permission by check the access identification (AID) permission table 208. Since each piece of the page-based secure range information (page-based SR_info) represents a corresponding 4 KB-aligned memory page, the 4 KB alignment requirement on the page table is supported. It's noted that the 4 KB alignment is just one embodiment of this disclosure, and the scope of this disclosure is not limited to 4 KB alignment only. With such design, the high memory utilization rate is achieved.

In one embodiment, the secure range permission checker 210 may be a memory protection unit (MPU).

In this embodiment, some of the intellectual property (IP) cores 202 each comprises a translation lookaside buffer (TLB) engine 220 caching the partial input-output memory management unit (IOMMU) table 221 for performing virtual address translation and attaching the corresponding page-based secure range information (page-based SR_info) to the DRAM controller 204. Some of the intellectual property (IP) cores may not need virtual address translation, such as CPU cores and GPU cores. In this scenario, each of the IP cores includes a translation lookaside buffer (TLB) 222 engine caching the partial input-output memory protection unit (IOMPU) table 223 for retrieving page-based secure range information (page-based SR_info) and attaching to the DRAM controller 204.

To be clear, both of the IOMMU table 214 and the IOMPU table 212 are configured to store the page-based secure range information. A region-based secure range information (region-based SR_info) is to be defined by the start address and the end address stored in the secure range table 206. The secure range table 206 is configured to store the start address and the end address so that at least one continuous memory space is defined as a protection range by the start address and the end address stored in the secure range table 206. The continuous memory space defined by the start address and the end address is represented by a region-based secure range information (region-based SR_info).

When the IP core 102 posts an access request to the DRAM 216, a page-based secure range information may be obtained by looking up the IOMMU table 214 and the IOMPU table 212 and a region based secure range may be obtained by looking up the secure range table 206 according to the physical address of the access request. In general scenario, the page-based secure range information (page-based SR_info) and the region-based secure range information (region-based SR_info) may be the same. Then the secure range permission checker 210 would check the access identification (AID) permission table with the corresponding secure range info.

In the other scenario, the page-based secure range information and the region-based secure range information may be different. For example, the dram access physical address is 0x0000. By looking up the IOMMU table 214 or the IOMPU table 212, the page-based SR_info is 5. However, according to the secure range table 206, the region-based SR_info is 3. In this scenario, the secure range permission checker 106 may identify such access is not permitted, or use the minimum value of the SR_info to check the permission in the AID permission table 208.

In another example, the dram access physical address is 0x0000. By looking up the IOMMU table 214 or the IOMPU table 212, the page-based SR_info is 5. However, according to the secure range table 206, there are no hits for the region-based SR_info. Then, the secure range permission checker 210 may use the page-based SR_info, which is 5 in this example, to check the permission in the AID permission table 208.

Yet still in the other example, the dram access physical address is 0x0000. By looking up the IOMMU table 214 or the IOMPU table 212, the physical address "0X000" is indicated as non-secure region (NSR) in the IOMMU table 214 or the IOMPU table 212. However, according to the secure range table 206, the region-based SR_info is 3. Then, the secure range permission checker 210 may use the region-based SR_info, which is 3 in this example, to check the permission in the AID permission table 208.

The access permission check may be done by the secure range permission checker 210 in the DRAM controller 204 according to the secure range information (SR_info) and access ID corresponding to each IP core 202.

In the other embodiment, the secure range permission checker 210 may be embedded in the local bus 205.

Figure 3:
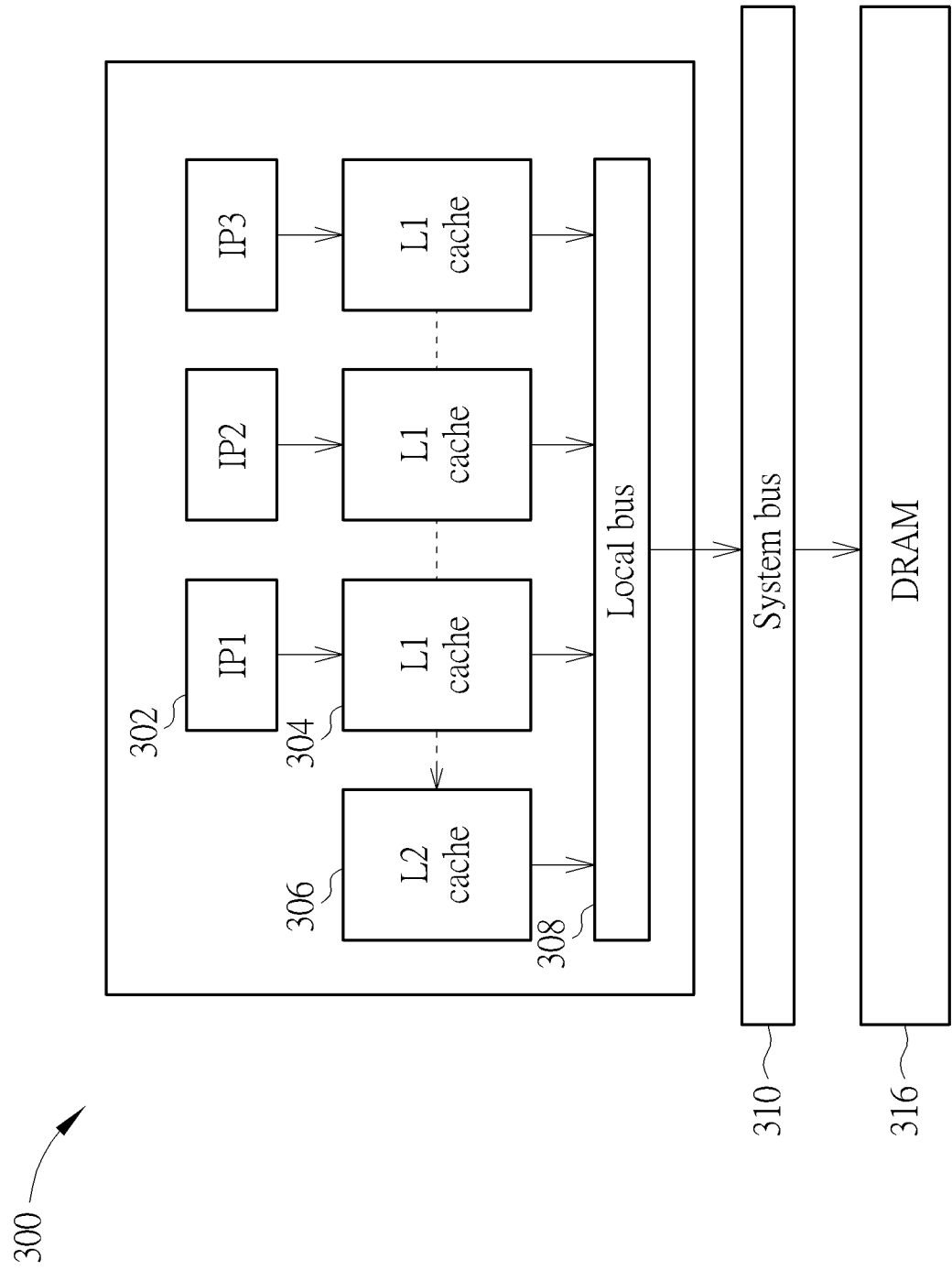
FIG. 3 is a block diagram of a system on chip according to another embodiment of the present invention.

FIG. 3 is a block diagram of a system on chip 300 according to another embodiment of the present invention. The data of IOMMU solution 104 including the partial IOMPU table 212 and the partial IOMMU table 214 are buffered in the caches 306 and 304 of the TLB engine 220 and the TLB engine 222 respectively. In this embodiment, each IP core 302 corresponds to an L1 cache 304, and all IP cores 302 share an L2 cache 306. When retrieving the secure range information, the L1 cache 304 may be looked up first. If the corresponding secure range information cannot be retrieved from the L1 caches 304, the L2 cache 306 will be looked up subsequently. If the corresponding secure range information is still not found after looking up the L2 cache, the IP cores 302 may request to update the data in the L1 caches 304 or the L2 cache 306 from the DRAM 316 in the page table walk accordingly. Both L1 and L2 caches can be coupled to a local bus 308, and the local bus 308 is coupled to a system bus 310 to connect to the dynamic random access memory (DRAM) 316.

Figure 4:
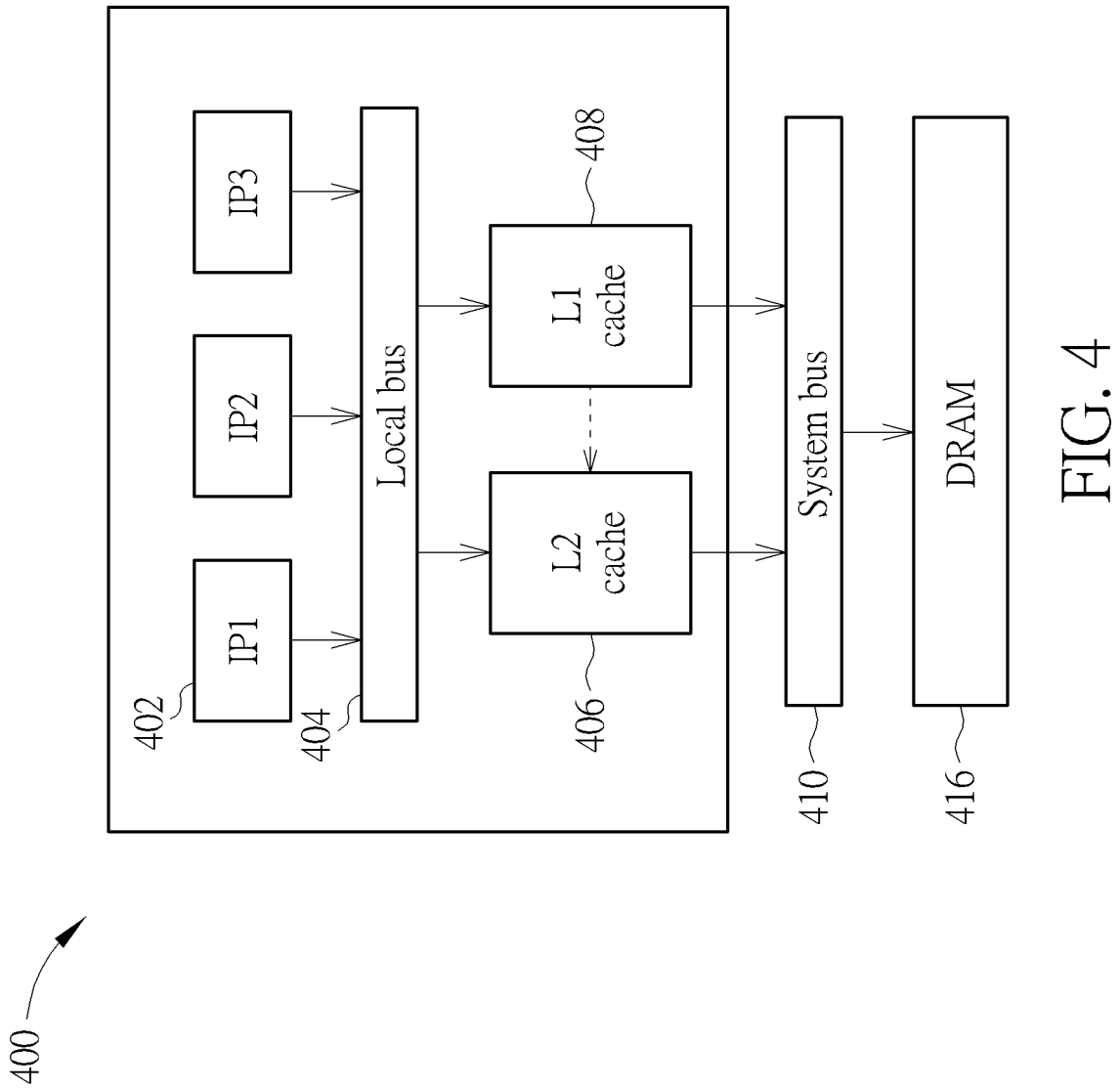
FIG. 4 is a block diagram of a system on chip according to another embodiment of the present invention.

FIG. 4 is a block diagram of a system on chip 400 according to another embodiment of the present invention. At least one intellectual property (IP) core 402 shares the partial input-output memory management unit (IOMMU) table 221 in the translation lookaside buffer (TLB) 220. At least one intellectual property (IP) core 402 has a translation lookaside buffer (TLB) 222 catching the partial input-output memory protection unit (IOMPU) table 223.

In this embodiment, both the TLB 220 and the TLB 222 catching the partial input-output memory management unit (IOMMU) table 221 and partial input-output memory protection unit (IOMPU) table 223 in L1 cache 408 and L2 cache 406. The L1 cache 408 and L2 cache 406 are shared by a plurality of IP cores 402 in the present embodiment. The local bus 404 connects more than one intellectual property (IP) core 402 and the L1 cache 408 and L2 cache 406 together. Then, the L1 cache 408 and L2 cache 406 are coupled to the system bus 410, and the system bus 410 is connected to the dynamic random access memory (DRAM) 416.

Table 1 shows the structure of the input-output memory management unit (IOMMU) table 1040 or 214. The first column of Table 1 lists virtual addresses (VA). The second column of Table 1 lists physical addresses PA0-PA15 of the DRAM 116 or 216 corresponding to the virtual addresses (VA). The third column of Table 1 lists secure range information corresponding to the physical addresses PA0-PA15.

TABLE 1

IOMMU Table

| Virtual Address | Physical Address | Secure Range Information |
|---|---|---|
| VA1 | PA0 | SR1 |
| VA4 | PA1 | SR15 |
| . | . | . |
| . | . | . |
| . | . | . |
| VA6 | PA7 | SR3 |
| . | . | . |
| . | . | . |
| . | . | . |
| VA0 | PA15 | SRn |

Table 2 shows the structure of the input-output memory protection unit (IOMPU) table 1042 or 212. The first column of Table 2 lists the physical addresses (PA) PA0-PA15. The second column of Table 2 lists secure range information corresponding to the physical addresses PA0-PA15.

TABLE 2

IOMPU Table

| Physical Address | Secure Range Information |
|---|---|
| PA0 | SR1 |
| PA1 | SR15 |
| . | . |
| . | . |
| PA7 | SR3 |
| . | . |
| . | . |
| PA15 | SRn |

The input data of the input-output memory management unit (IOMMU) table 1040 or 214 is virtual address and the input data of the input-output memory protection unit (IOMPU) table 1042 or 212 is physical address (PA). When a virtual address pointed by the input-output memory management unit (IOMMU) table 1040 or 214 has the same physical address pointed by the input-output memory protection unit (IOMPU) table 1042 or 212, the virtual address and the physical address direct to the same page-based secure range information (page-based SR_info). The memory utilization is high because the secure buffer doesn't need to be allocated in a continuous address space. The secure buffer could be allocated by IOMMU table 1040 or 214 on a 4 KB page basis. The protection mechanism relies on the page-based secure range information (page-based SR_info) through the physical addresses PA0-PA15 received from the IOMMU table 1040 or IOMPU table 1042 or 212. When a non-secure IP core tries to access secure pages, the SR_info will indicate that the page is a secure page, and the secure range permission checker 106 or 210 will prevent from being accessed by a non-secure IP core.

Table 3 is the access identification (AID) permission table 1062 or 208. The first column of the access identification (AID) permission table 1062 lists names of the intellectual property (IP) cores 102 or 202 such as IP1, IP2, and other IP names. The second column is access ID of each IP core, providing a way to recognize the IP cores. The third column to the last column are secure ranges. With the 0s and 1s of the read or write of the secure ranges, the secure range permission checker 106 or 210 can recognize which secure range can be read or written.

TABLE 3

| | | Secure Ranges | | | | | |
|---|---|---|---|---|---|---|---|
| Name | Access ID | SR0 R/W | SR1 R/W | SR2 R/W | SR3 (Secure OS) R/W | ... | SRn R/W |
| IP1 | 1 | 1/1 | 0/0 | 0/0 | 0/0 | | ... 0/0 |
| IP2 | 2 | 1/0 | 1/1 | 0/0 | 0/0 | | ... 1/0 |
| IP3 | 3 | 0/0 | 1/1 | 0/0 | 0/0 | | ... 0/0 |
| IP4 | 4 | 1/0 | 1/0 | 1/1 | 0/0 | | ... 0/0 |
| IP5 (SCPU) | 5 | 1/1 | 1/1 | 1/1 | 1/1 | | ... 1/1 |
| ... | ... | ... | ... | ... | ... | | ...... |

When the access IP is IP1, the access ID is 1, SR0 can be read and written, and SR1, SR2, SR3 and SRn cannot be read and written. When the access IP is IP2, the access ID is 2, SR0 and SRn can be read but not written, SR1 can be read and written, and SR2 and SR3 cannot be read and written. When the access IP is IP3, the access ID is 3, SR1 can be read and written, and SR0, SR2, SR3 and SRn cannot be read and written. When the access IP is IP4, the access ID is 4, SR0 and SR1 can be read but not written, SR2 can be read and written, and SR3 and SRn cannot be read and written. When the access IP is IP5, the access ID is 5, and SR0, SR1, SR2, SR3 and SRn can be read and written.

In some embodiment, SR0 may be indicated as non-secure region (NSR) which means that doesn't belong to any secure range (SR). To be noted, when a specific physical address of a DRAM is indicated as "SR0" in the page-based SR_info, the region-based SR_info of such physical address of the DRAM may still be indicated as a specific secure range which is not NSR. Moreover, when a specific physical address of a DRAM is indicated as "SR0" in the region-based SR_info, the page-based SR_info of such physical address of the DRAM may still be indicated as a specific secure range which is not NSR. Therefore, the secure range permission checker shall check the access permission in AID permission table according to the SR_info indicating the specific range in such scenario. By using the access identification (AID) permission table 1062 or 208, an IP without permission would be denied access to the dynamic random access memory (DRAM) 108 or 216. Therefore, a memory protection with high memory utilization rate using the input-output memory management unit (IOMMU) solution can be achieved.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A system on chip, comprising:
    a dynamic random access memory (DRAM) controller, comprising:
        a secure range (SR) table configured to store a start address, an end address, and enabled registers of each secure range; and
        an access identification (AID) permission table configured to store access permissions of secure ranges of each access identification;
    a secure range permission checker embedded in the dynamic random access memory (DRAM) controller or a bus and linked to the secure range (SR) table and the access identification (AID) permission table, and configured to check the access permissions of the secure ranges according to the access identification (AID) permission table; and
    a plurality of intellectual property (IP) cores linked to the dynamic random access memory (DRAM) controller, and comprising a translation lookaside buffer (TLB) comprising an input-output memory management unit (IOMMU) table or an input-output memory protection unit (IOMPU) table to store secure range information, each IP core being configured to access specific data in a DRAM according to the secure range information;
    wherein when a virtual address pointed by the input-output memory management unit (IOMMU) table has a same physical address pointed by the input-output memory protection unit (IOMPU) table, the virtual address and the physical address direct to identical secure range information.

2. The system on chip of claim 1, wherein some of the intellectual property (IP) cores each comprise a translation lookaside buffer (TLB) comprising an input-output memory management unit (IOMMU) table.

3. The system on chip of claim 1, wherein some of the intellectual property (IP) cores each comprise a translation lookaside buffer (TLB) comprising an input-output memory protection unit (IOMPU) table.

4. The system on chip of claim 1, wherein the secure range permission checker is a memory protection unit (MPU).

5. The system on chip of claim 1, wherein the input-output memory management unit (IOMMU) table is configured to store physical addresses corresponding to virtual addresses, and secure range information corresponding to the physical addresses.

6. The system on chip of claim 1, wherein the input-output memory protection unit (IOMPU) table is configured to store secure information range corresponding to physical addresses.

7. The system of chip of claim 1, wherein the input-output memory management unit (IOMMU) table and the input-output memory protection unit (IOMPU) table are updated from the dynamic random access memory (DRAM).

8. The system of chip of claim 1, wherein the translation lookaside buffer comprises a level one cache and a level two cache.

9. The system of chip of claim 8, wherein the level one cache is corresponding to one of the plurality of intellectual property (IP) cores or shared by the plurality of intellectual property (IP) cores and the level two cache is shared by the plurality of intellectual property (IP) cores.

10. A computing device, comprising:
    a plurality of intellectual property (IP) cores, each being represented by an access identification (AID);
    a dynamic random access memory (DRAM) with a management table configured to store secure range information corresponding to a physical address or a virtual address; and
    a secure range permission checker, embedded in a dynamic random access memory (DRAM) controller or a bus, configured to check access permissions of secure ranges according to the access identification (AID) and the secure range information obtained by the management table in accordance with a DRAM access request issued by the IP core, wherein the virtual address or the physical address is conveyed in the access request;
    wherein when a virtual address pointed by the input-output memory management unit (IOMMU) table has a same physical address pointed by the input-output memory protection unit (IOMPU) table, the virtual address and the physical address direct to identical secure range information.

11. The computing device of claim 10, wherein some of the intellectual property (IP) cores each comprise a translation lookaside buffer (TLB) comprising an input-output memory management unit (IOMMU) table.

12. The computing device of claim 10, wherein some of the intellectual property (IP) cores each comprise a translation lookaside buffer (TLB) comprising an input-output memory protection unit (IOMPU) table.

13. The computing device of claim 10, wherein the secure range permission checker is a memory protection unit (MPU).

14. The computing device of claim 10, wherein more than one intellectual property (IP) core has a translation lookaside buffer (TLB) comprising an input-output memory management unit (IOMMU) table.

15. The computing device of claim 10, wherein more than one intellectual property (IP) core has a translation lookaside buffer (TLB) comprising an input-output memory protection unit (IOMPU) table.

16. A method for controlling access permissions to a memory, comprising:
    issuing an access request with an address information to the memory by a master represented by an access identification;
    checking the address information is a virtual address or a physical address in a translation lookaside buffer (TLB);
    fetching a physical address and a first secure range information (SR_info) from an IOMMU table when the address information is the virtual address; and
    fetching the first secure range information (SR_info) from a IOMPU table when the address information is the physical address;
    wherein when a virtual address pointed by the input-output memory management unit (IOMMU) table has a same physical address pointed by the input-output memory protection unit (IOMPU) table, the virtual address and the physical address direct to identical secure range information.

17. The method of claim 16, further comprising fetching a second secure range information (SR_info) according to the physical address.

18. The method of claim 17, further comprising controlling access permission according to the access identification and at least one of the first secure range information and the second secure range information.

19. The method of claim 17, wherein the first secure range information is a page based secure range information and the second secure range information is the region based secure range information.

* * * * *